(12) United States Patent  (10) Patent No.: US 6,379,138 B1
Puniello et al.  (45) Date of Patent: Apr. 30, 2002

(54) INJECTION MOLDING APPARATUS

(75) Inventors: Paul A. Puniello, Bristol, RI (US); Robert A. Wilson, Sagamore, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/707,982

(22) Filed: Nov. 8, 2000

(51) Int. Cl.⁷ .......................... B29C 70/70; B29C 45/36
(52) U.S. Cl. ...................... 425/116; 425/125; 425/468; 425/577
(58) Field of Search ................ 425/116, 125, 425/577, 468, DIG. 5

(56) References Cited

U.S. PATENT DOCUMENTS

| | | |
|---|---|---|
| 721,462 A | 2/1903 | Richards |
| 2,361,348 A | * 10/1944 | Dickson et al. |
| 3,051,774 A | * 8/1962 | Schelke |
| 3,244,499 A | 4/1966 | Wiley ........................ 65/359 |
| 3,650,658 A | 3/1972 | Shimada et al. ............ 425/418 |
| 3,752,622 A | 8/1973 | Viadana ........................ 425/78 |
| 3,893,644 A | 7/1975 | Drazick ........................ 249/68 |
| 4,959,000 A | * 9/1990 | Giza ........................... 425/116 |
| 5,112,556 A | * 5/1992 | Miller ..................... 425/450.1 |
| 5,122,046 A | 6/1992 | Lavallee et al. ............. 425/116 |
| 5,147,657 A | * 9/1992 | Giza ........................... 425/577 |
| 5,827,466 A | 10/1998 | Yamaguchi ............... 264/279.1 |
| 5,827,548 A | 10/1998 | Lavallee et al. ............. 425/116 |
| 6,238,194 B1 | * 5/2001 | Inoue et al. ................ 425/116 |

FOREIGN PATENT DOCUMENTS

| | | |
|---|---|---|
| JP | 09000 661 | 1/1997 |
| JP | 9000 662 | 1/1997 |

* cited by examiner

*Primary Examiner*—Robert Davis
(74) *Attorney, Agent, or Firm*—Swidler Berlin Shereff Friedman, LLP

(57) ABSTRACT

The present invention relates to a retractable pin assembly for an injection mold. One end of the retractable pin is inside the mold, while the other end extends outside of the mold cavity. The inside end of the retractable pin may by shaped to conform with the shape and texture of the mold cavity wall. The retractable pins are moved in and out of the mold cavity by cams that rotate around the injection mold.

21 Claims, 5 Drawing Sheets

INJECTION MOLDING APPARATUS

FIELD OF THE INVENTION

The present invention is directed to a cam ring for actuating retractable pins for a golf ball injection mold.

BACKGROUND OF THE INVENTION

It is standard practice in the fabrication of an intermediate layer or cover layer of a golf ball to utilize an injection mold having two mold plates with hemispherical cavities that mate to form a spherical shape when the mold halves are joined. At the initial stage of the injection molding process, a golf ball core placed inside the mold is supported centrally within the mold by a plurality of retractable pins located near the upper and lower poles of the mold cavity so as to leave a space for forming an intermediate or cover layer about the core. The retractable pins are activated by a plate that controls movement of the pins in a vertical direction to engage with the core to hold it securely in place. After the pins have engaged with the core of the ball, thermoplastic or thermnosetting material then is injected into the mold cavity in a horizontal plane from a primary supply through a plurality of edge gates that usually are evenly distributed near or around the parting line of the mold halves and the equator of the inner hemispherical surface of the golf ball. The retractable pins hold the core in place while the injected material fills the void between the core and the inside wall of the mold. Trapped air and gasses escape through vents located at the upper and lower poles of the ball as flow from injected material from each of the plurality of gates eventually joins to fill the void between the golf ball core and the mold. Once the void is nearly filled but before the injected material has completely hardened, the pins are retracted from the mold cavity in a vertical direction until the faces of the pins form a portion of the mold cavity wall. If the pins are retracted only after the injected covering material has contacted the pins, any voids formed from retraction of the pins are filled by the injected material. Once the injected material has substantially hardened, the mold is opened and the ball is removed.

Use of a plurality of retractable pins to securely position the golf ball core during the injection process is known to cause wear at the interface between the surfaces of the pins and the surfaces of the pin holes in the mold plate through which the pins are inserted. Typically, the face of the pins that contact the core of the ball are not normal, i.e. perpendicular, to the direction of the axial force applied to the pins to cause them to engage with the core. In a conventional retractable pin golf ball injection mold, illustrated in FIGS. 1 and 2, the pins are arranged in a circle and are engaged with the core by being inserted into the mold in a vertical direction. The faces of the pins, however, are angled so that they contact the core essentially along a tangent to the contacted surface of the ball in order to have a good grip on the golf ball core. For forming intermediate layers, the faces of the pins that contact the ball core typically are curved to conform with the mold cavity wall (e.g. having a radius cut) or have an angle cut matching the tangent to the point of ball contact, whereas the tips of pins in an injection mold to form a cover layer are shaped with a dimple radius formed on the end thereof. In both instances, the faces of the pins contact the ball at an angle not normal to the direction of the vertical axial force applied to the pins. As a result, the ball core applies a counterbalancing force on the pins that has an axial load component and a cantilever load component. As the pins move under this cantilever load when engaging or disengaging from the ball core, the pin holes are worn out of round and the pins may spread, flex and/or experience extensive wear. In some instances, galling of the pin and pin hole may result. Wear between the pins and pin holes eventually becomes excessive and allows injected material to flow into the worn area, causing undesirable flash on the surface of the molded layer of the ball. The result of this undesired wear is that the manufactured balls require additional process steps to remove the flash and the mold must be shut down periodically for inspection, repair and/or replacement of worn tooling. Thus, it would be desirable to engage and disengage the retractable pins in a direction that is essentially normal to the tangent of the contacted surface of the ball.

A second disadvantage of conventional retractable pin injection molding that results from having the retractable pins not operate in a direction normal to the tangent of the point of contact with the ball core is the time, expense and precision required for forming the face of the pin. Because the faces of conventional retractable pins are angled to better grip the ball, forming a dimple radius on the end of each pin requires expensive, high-precision processing, such as using an EDM process to "burn" the shape of the dimple on the end of the pin or using a compound angular set up to produce an oblique conical radius on the pin. The dimple formed on the face of the pin is elliptical because the face of the pin is elliptical due to its angled cut, pins being generally circular in cross-section. Noticeable cosmetic defects can result if the elliptical dimples formed on the face of the pin are even slightly out of place. Moreover, because each pin is custom-made to match the geometry of the mold, the pins can not be used in a mold having a different geometry. Thus, the retractable pins can not be reused or repositioned should the mold geometry or dimple pattern change.

Yet another disadvantage associated with conventional injection molding is that the use of multiple gates dispersed around the equator of the mold cavity is known to cause "knit lines" on the newly formed ball layer when injected layer material from neighboring gates intersects as the material fills the mold cavity. "Knit lines" are seams along the newly formed intermediate layer or cover layer that are formed where the injected material intermixes from different gates during the formation of the layer.

FIG. 2 illustrates the formation of knit lines 10 as flow from any one gate 12 intersects with flow from a neighboring gate. When a golf ball cover is formed by a conventional retractable pin injection process with multiple edge gates to inject a layer material into a mold, the injected material from each gate has a flow front that eventually intersects with layer material entering the mold from other edge gates. Knit lines are formed at the intersection of each of these converging flow fronts. The multiple knit lines of the newly formed layer ultimately intersect at the flow terminus of the layer material near the upper and lower poles of the mold cavity. As such, there are a number of knit lines or flow fronts throughout a layer where layer material from various gates flows together as it fills the void between the golf ball core and the mold. Depending on the composition of the injected material, the material tensile strength can be reduced by as much as 10% to 60% along the knit lines. Thus, because the intermediate or cover layer is inherently weaker along the knit lines, it is desirable to minimize the occurrence of knit lines when forming a golf ball layer. Therefore, there exists a need for a method of making golf ball layers by an injection molding process that does not result in the occurrence of knit lines, thereby increasing the durability of the layer and extending the useful life of the golf ball.

In addition to resulting in knit lines that may weaken the golf ball cover, conventional multiple edge gate injection molding also may not maintain balanced flow or uniform filling of thermoplastic resin blend cover material between the core and the inside wall of the mold, which may further weaken the golf ball cover. For example, non-uniform filling can cause the flow terminus of the cover to not meet at the poles of the ball where trapped air and gasses typically are released through a vent. When the flow terminus is not at the poles of the mold, the trapped air and gasses cannot evacuate the cavity effectively, thereby further compromising knit line integrity and reducing the durability of the cover.

Even in instances where flow of injected layer material is properly balanced, venting of trapped air and gasses at the poles of the mold can be a limiting factor in the speed at which layer material is injected and eventually requires time-consuming periodic maintenance of the vents to clear clogs. Because it is desirable for the gap between the vent pin and the wall of the mold surrounding the pin to be sufficiently narrow to prevent injected material from escaping and causing flash on the newly formed layer, the limited space provided for trapped air and gasses to escape may slow the injection of layer material. In addition, injected material can become clogged in the vent over time. Removing this trapped debris clogging the vent pin requires periodic maintenance, possibly even requiring disassembly of the mold tooling. Placing vents at the parting line of the mold rather than at the pole would greatly improve venting and allow for easy removal of debris each time the mold is opened to remove the ball.

One solution to eliminating knit lines, achieving balanced flow and improving venting is to use a hot runner system to inject layer material at the poles of the ball rather than using multiple gates at or near the parting line of the mold and to vent trapped air and gasses at or near the parting line of the mold instead of at the poles. The relatively cramped space at the poles of conventional retractable pin injection molds, however, does not permit the use of such a hot runner system at the poles of the ball. Typically, as shown in FIGS. 1 and 2, a plurality of retractable pins 16 surround the pole in part to minimize the angle between the vertical direction in which the pins move and the angle of the faces of the pins contacting the ball, which in turn minimizes wear at the interface between the surfaces of the pins and the surfaces of the pin holes. As the pins in a conventional mold are moved away from the pole, the pins become increasingly prone to spreading, flexing and wear. Thus, while it would be beneficial to reconfigure mold geometry to provide direct gating at the poles and venting at the parting line of the mold, it is highly desirable to achieve such changes without compromising the useful life of the retractable pins.

Some prior attempts to use this approach to solving the problems associated with conventional retractable pin injection molding are described in U.S. Pat. No. 5,147,657 to Giza, which is incorporated by reference in its entirety, Du Pont application 88-366575 and Bridgestone application JP 09000661 (95-176708). While these references describe remedies for some of the limitations of conventional retractable pin injection molding, each also has certain inherent drawbacks not found in the present invention. For instance, while these references permit relocation of the retractable pins to locations away from the poles of the ball, the potential for accelerated wear on the pins and pinholes in the mold plates due to non-axial forces applied to the pins can be considerable depending upon the angle between the direction in which pins operate and the direction of the forces applied to the pins. In addition, these reconfigured golf ball molds have utilized complex, bulky mechanisms to engage and disengage the pins in a direction normal to the point of contact. Thus, each of these prior solutions to the problems encountered by conventional retractable pin injection molding provides only limited flexibility in pin placement and adds considerable bulk and complexity to the golf ball mold.

SUMMARY OF THE INVENTION

The present invention is directed to the formation of an intermediate layer or cover layer over a golf ball core by an injection molding process or injection/compression molding process. In particular, the injection mold utilizes a ring gear assembly having a cogwheel 18 with cam inserts 20 that cause the retractable pins to engage with a ball core 22 in a direction approximately perpendicular to the plane tangential to the point of contact on the ball core by the pins. Because the ring gear assembly will activate retractable pins 16 approximately radially inward toward the ball center, i.e. in a direction approximately normal to the tangential line of contact with the ball, it is expected that problems of wear, periodic inspection and maintenance of the pins and pin holes that are associated with conventional retractable pin injection molding will be significantly reduced. Use of the ring gear assembly also allows the retractable pins to be positioned nearly anywhere in the mold, preferably away from the poles of the golf ball so that sufficient space is provided at the poles for injection of material. As discussed more fully below, relocating the retractable pins away from the poles of the golf ball mold overcomes several limitations found in conventional golf ball injection mold configurations.

The present invention remedies the inherent problems found in conventional multiple gate retractable pin golf ball injection molds by utilizing a compact mechanism to engage and disengage the pins in a direction approximately normal to the tangent of the point of contact on the ball surface through application of forces that differ only slightly from the longitudinal axis of the pin. Because the retractable pins operate in a direction approximately normal to the point of contact with the ball surface, the faces of the pins 24 that contact the ball could be easily and inexpensively shaped to securely grip the ball core when engaged and to correspond to the inner wall of the mold cavity when retracted. For instance, when the injection mold is for forming an intermediate layer of the golf ball, the faces of the retractable pins may be flat or readily shaped to correspond to the curvature of the mold wall. When the mold is for forming a cover layer for a dimpled ball, the faces of the retractable pins may be shaped with a full radius to correspond to a dimple on the ball. The present invention also has the added advantage of allowing retractable pins 16 to be positioned in nearly any location on the ball while imparting minimal non-axial forces during operation. Thus, the effect of wear due to non-axial forces is minimal regardless of the position of the pins. The ability to reposition the retractable pins to virtually any location of the mold also allows the pins to be positioned away from the poles of the mold, thereby permitting pole gating and parting line venting. In turn, injection of layer material at the poles of the ball allows for venting of trapped air and gasses to occur at the parting line between the mold plates, i.e. near the equator of the mold cavity, where the trapped air and gasses may be vented more quickly through a greater area. Thus, cycle times can be improved.

One embodiment of the present invention is a retractable pin assembly having a retractable pin 16 with one end 24 positioned inside a mold cavity and another end 26 outside the mold cavity. A cam 20 affixed to cogwheel 18 is positioned outside the mold cavity so that the cam contacts the outside end 26 of retractable pin 16 and causes the pin to move in or out of the mold as the cogwheel turns.

In one embodiment, the inside end 24 of retractable pin 16 has a shape substantially similar to that of a golf ball dimple, while in another embodiment inside end 24 of retractable pin 16 is shaped substantially in conformance with the curvature of the mold cavity.

In one embodiment, the surface of the cam in contact with the outside end of the retractable pin is essentially planar. More specifically, in one embodiment the planar surface of the cam is inclined at an angle θ less than 15 degrees. In yet another embodiment, the retractable pin assembly includes a spring for retracting the pins from the mold.

Another embodiment of the present invention involves a golf ball injection mold having a first and second mold plate, each having a substantially hemispherical inner surface such that when the mold plates are joined they form a substantially spherical cavity. In addition, a plurality of retractable pins extend from the inner surface of the spherical cavity to the outer surface of a golf ball core placed inside the cavity during the molding process. Each retractable pin travels in a direction approximately normal to the surface of the golf ball core through operation of slidable cams.

In one embodiment, the retractable pins are positioned to contact the ball core at an angle between about 10 degrees to about 80 degrees from the pole-to-pole axis of the golf ball mold. In another embodiment, the pins contact the ball core at an angle between about 30 degrees to about 60 degrees.

One embodiment further includes injection gates positioned at the poles of the mold plates. In another embodiment, the injection gates are connected to a hot runner system. Yet another embodiment further includes at least one vent located near the parting line of the golf ball mold.

In another embodiment, the slidable cams are affixed to at least one cogwheel positioned to rotate about an axis approximately coincident with the pole-to-pole axis of the golf ball mold. In yet another embodiment, the angle between the surface of the sliding cams and the retractable pins is between about 80 degrees to about 100 degrees. And in another embodiment the angle is approximately 90 degrees.

DETAILED DESCRIPTION OF THE INVENTION

Figure 1:
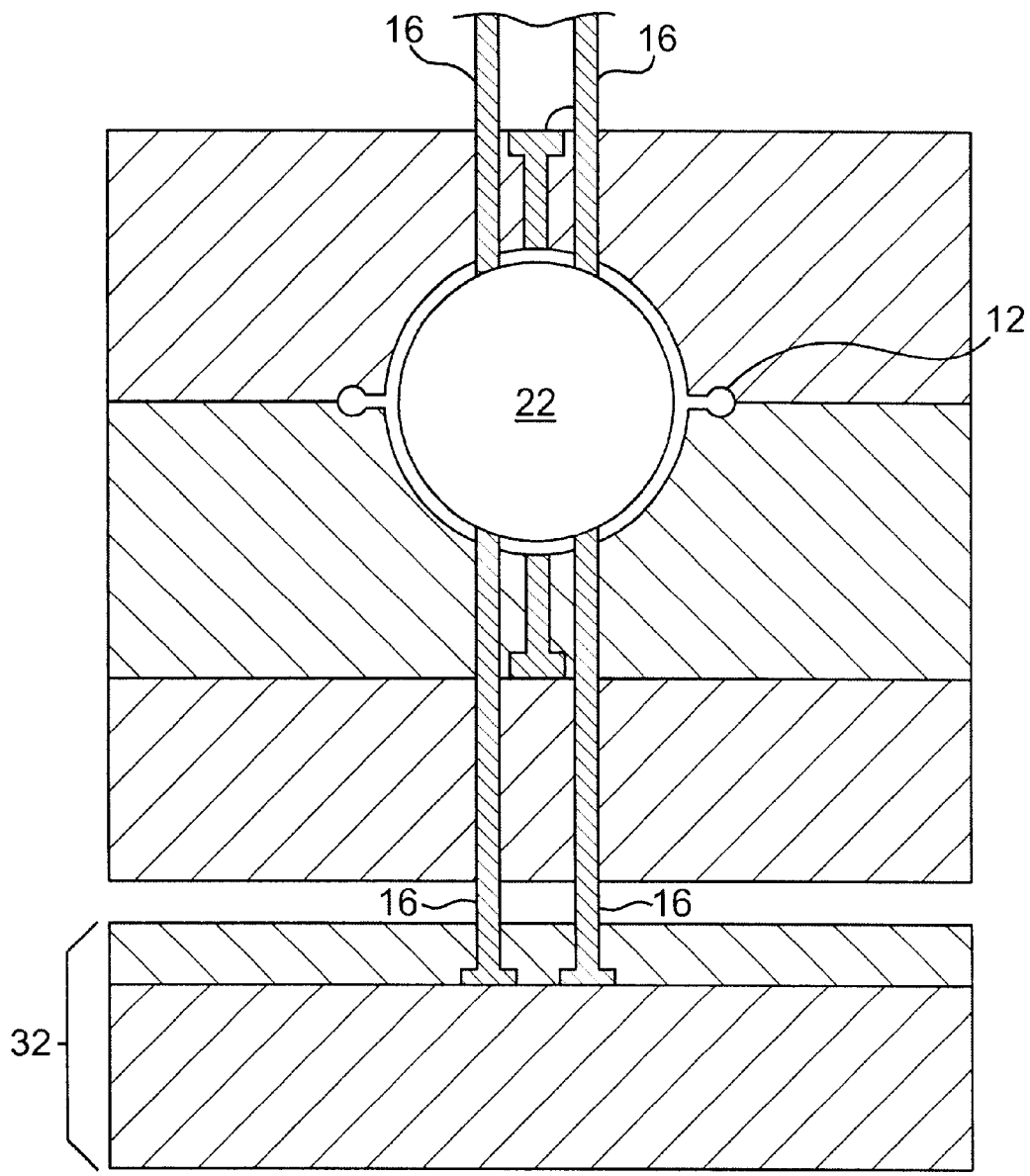
FIG. 1 is a cross-sectional view of a conventional retractable pin golf ball injection mold having multiple edge gates at the parting line of the mold halves and vents for releasing trapped air and gasses at the poles.
Figure 2:
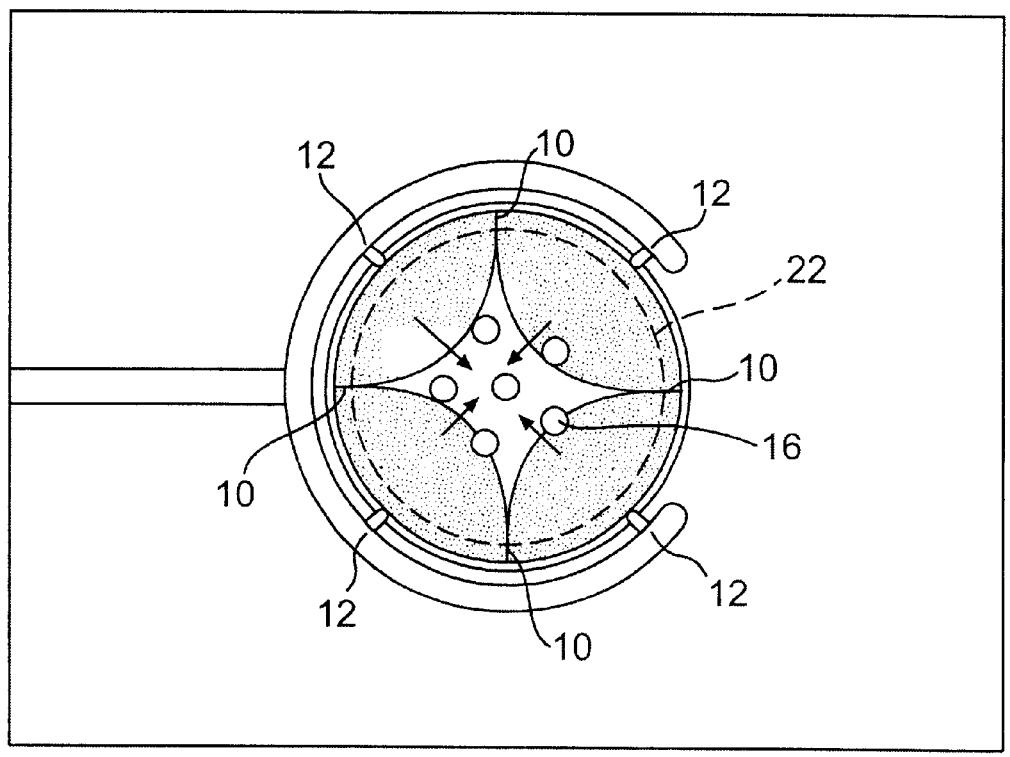
FIG. 2 is a top plan view of a conventional golf ball injection mold, wherein cover material injected into the mold through the multiple edge gates substantially covers the core and has surrounded one of the retractable pins, which are engaged with the core of the ball.

FIGS. 1 and 2 illustrate the problems encountered and described above when utilizing a conventional multiple edge gate golf ball injection mold. It is evident that cover material entering a mold through a plurality of gates 12 causes discontinuous point source forces on the golf ball core 22 that can result in unbalanced, nonuniform filling of the mold. These discontinuous point source forces must be carefully balanced in order to ensure that the golf ball core placed within the mold maintains its centered position during the covering process.

FIG. 2 illustrates the formation of knit lines as flow from any one gate 12 abuts with flow from a neighboring gate. As the mold is filled, knit lines are formed between each gate where the cover material abuts with an opposing flow source. The multiple knit lines of the cover ultimately intersect at the flow terminus of the cover material. While it is desirable that the flow terminus be located where trapped air and gasses are vented, i.e. at the poles of the mold cavity for a conventional golf ball injection mold, it is difficult to control the location of the flow terminus with conventional multiple edge gate injection molding. Moreover, cover material injected into a golf ball mold through a plurality of gates can cause the mold cavity to fill unevenly. This uneven filling of the mold leads to cover material reaching each of the retractable pins 16 at different times, which in turn further disrupts the filling of the mold.

Figure 3:
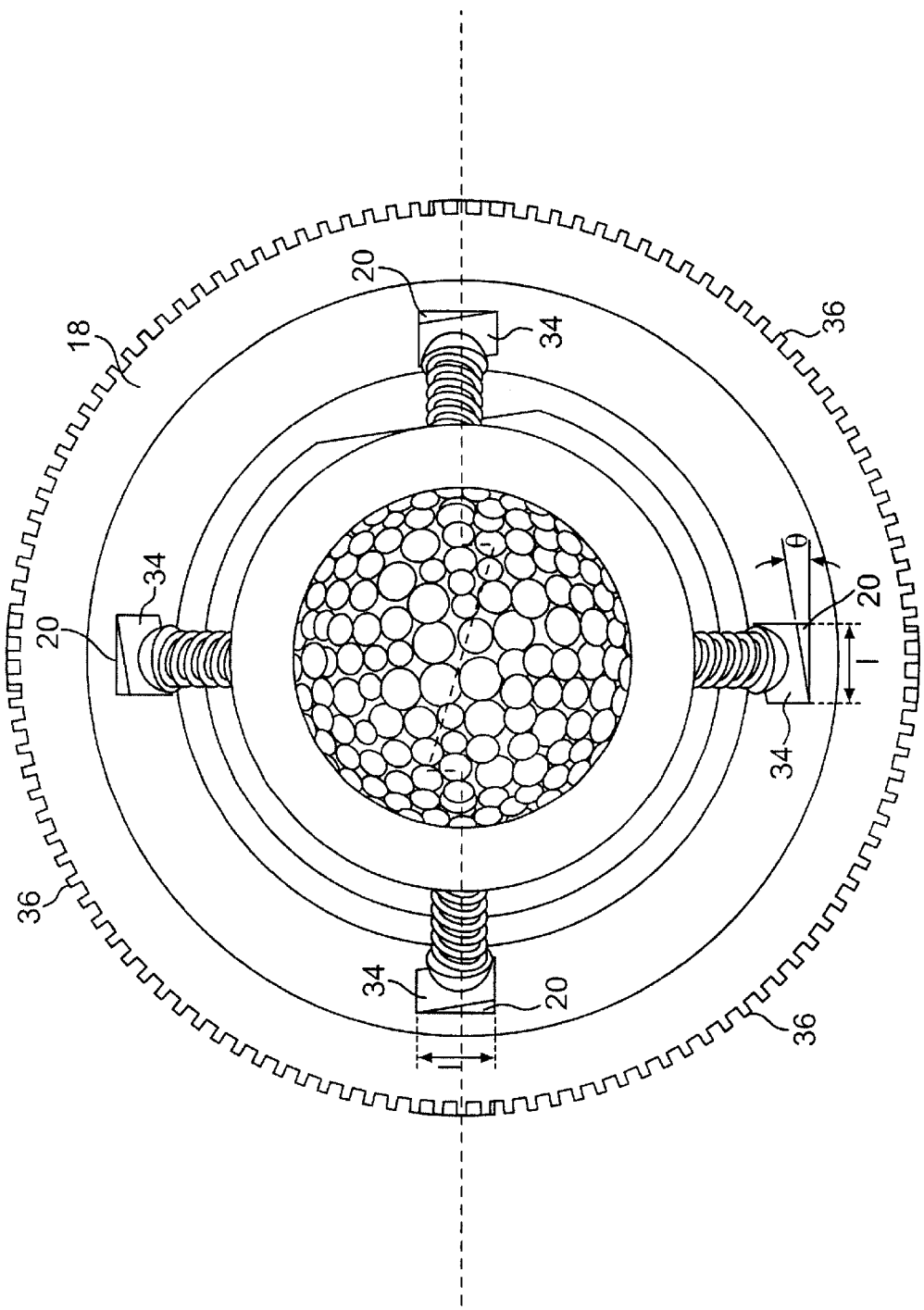
FIG. 3 is a top view of a partial mold assembly of the present invention.
Figure 4:
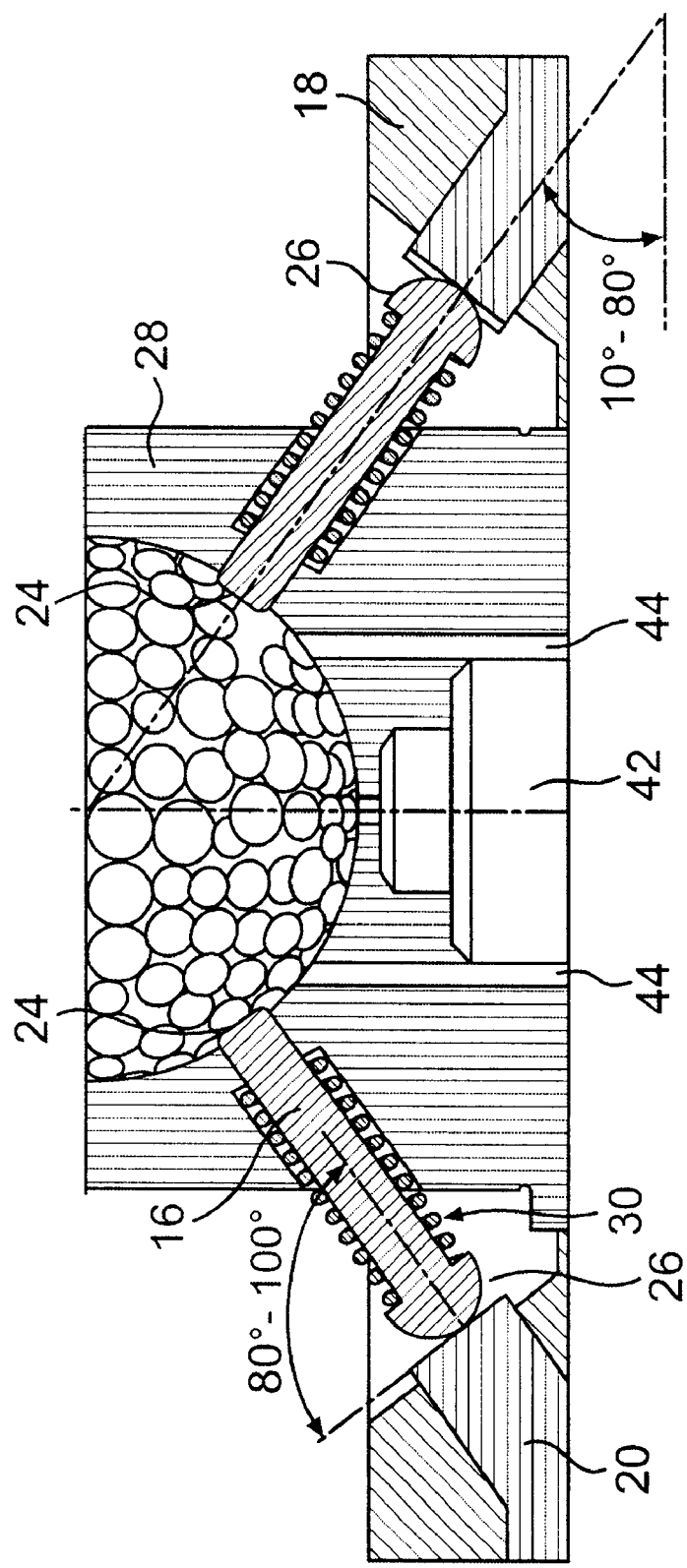
FIG. 4 is a cross-sectioned view of a partial mold assembly showing component parts of the present invention.
Figure 5:
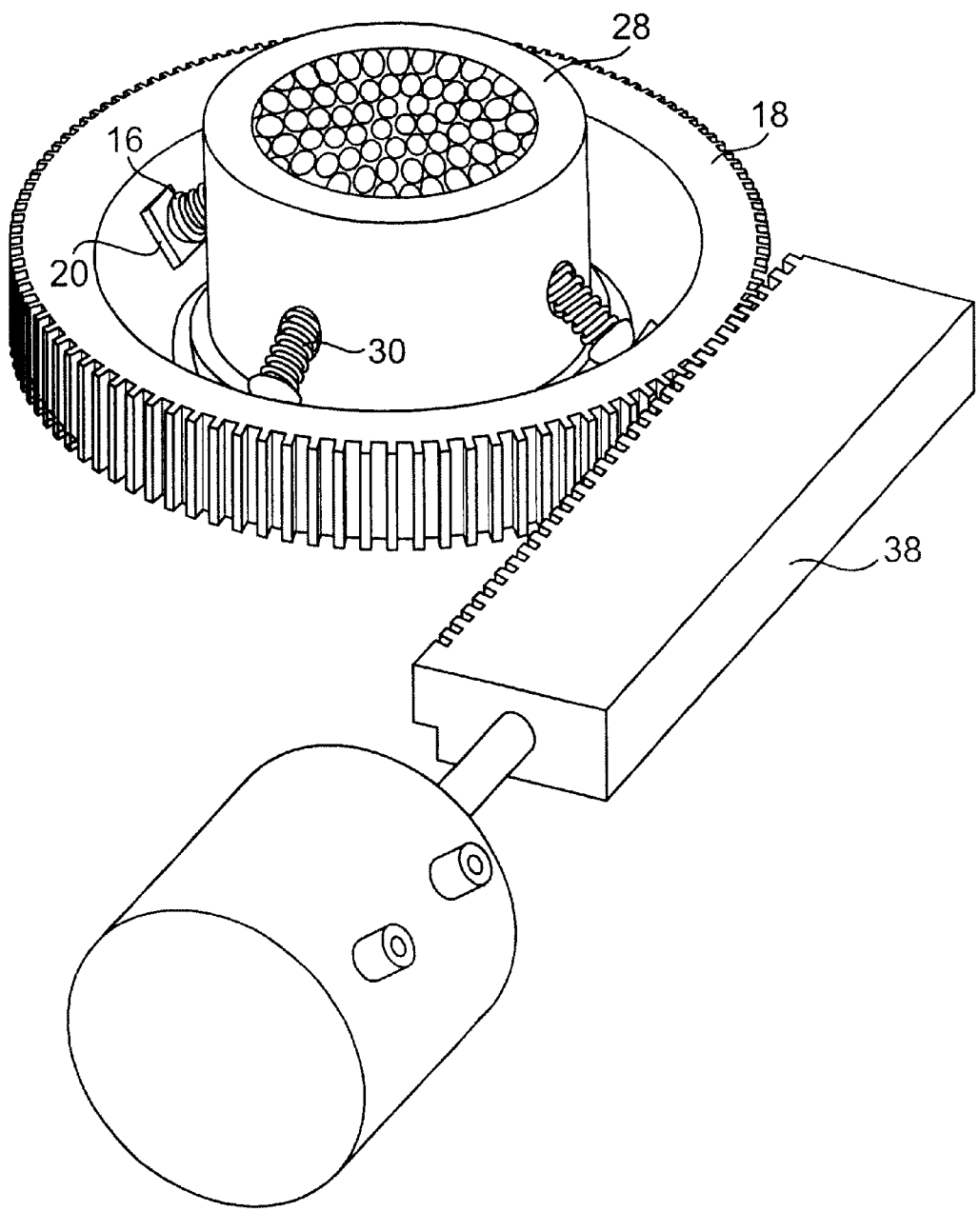
FIG. 5 is a solid rendering of a partial mold assembly showing component parts of the present invention.

FIGS. 3 and 4 illustrate a top view and cross-sectional view, respectfully, of a retractable pin assembly illustrating the present invention for a golf ball injection mold. The assembly is comprised of golf ball mold cavity plate 28, retractable pins 16, springs 30, profiled cam inserts 20 and cogwheel 18.

While the entire golf ball mold assembly is not illustrated in FIGS. 3 and 4, those skilled in the art would readily understand a golf ball mold to include opposing mold portions defined by two mold halves. Each mold half, in turn, defines a corresponding substantially hemispherical cavity and has a mating surface surrounding the substantially hemispherical cavity and facing the opposing mold half. The mating surfaces of the corresponding mold halves may be planar, non-planar (such as in U.S. Pat. No. 5,688,193, for example, which is incorporated by reference herein), or offset from the equator of the ball to be formed (such as in U.S. Pat. No. 4,389,365, for example, which is incorporated by reference herein). The geometry of the mating surfaces may be varied, for example, to accommodate a dimple pattern where dimples may be located on or near the equator of the ball, to ensure that the balls remain in a desired location when the mold portions are opened, or to provide that any flash or excess layer material is removed automatically upon opening of the mold. In addition, gates, subgates, or non-symmetrical gates may be formed by the mating surfaces of the corresponding mold halves. Examples of subgates and non-symmetrical gates are described in U.S. Pat. Nos. 5,827,548 and 5,827,466, which are incorporated by reference herein.

When the mold halves are brought together in proper registration at a parting line, with the mating surfaces in full contact with each other, the two substantially hemispherical cavities together define a substantially spherical mold cavity having one or more gates for injecting material for forming a cover layer or intermediate layer of a golf ball. Alternatively, the mold halves 28 may be joined to form vents for releasing trapped air and gasses at the parting line of the mold. The mold cavity surface may be smooth or textured according to the desired texture of the surface of the ball layer formed. When forming a cover layer for a golf ball, for instance, it is preferred that the mold cavity surface is textured to form a negative dimple pattern with a plurality of protrusions that form dimples in the finished golf ball cover.

Before the mold cavity is formed by joining the two mold plates 28 in proper registration, a substantially spherical golf ball core 22 first is placed into the mold. The golf ball core preferably is positioned within the mold cavity so that it is essentially evenly spaced apart from the inner walls of the mold cavity. To maintain the position of the golf ball core in the mold cavity before and during injection of material that will form the cover layer or intermediate layer of the golf ball, the golf ball core is supported within the mold cavity by a plurality of retractable pins 16 that extend from the inner surface of the mold cavity to the outer surface of the golf ball core.

As illustrated in FIGS. 1 and 2, retractable pins 16 for conventional golf ball injection molds operate in an upward or downward direction to engage or disengage with the golf ball core. Such conventional injection molds operate the retractable pins simply by operating in a vertical direction a plate assembly 32 to which the retractable pins are attached. As explained above, operation of the retractable pins in a vertical direction imparts cantilever loads upon the retractable pins when engaged with the golf ball core. These loads may cause the pins to spread, flex and prematurely wear the pinholes in the golf ball mold.

In the present invention (see FIGS. 3 and 4), however, each retractable pin 16 travels in a direction approximately radially inward toward the ball center. Because the direction of travel for the retractable pins under the present invention is substantially different from one another, sliding cams 20 positioned to match each retractable pin may be used to activate the retractable pins. Sliding cams 20 are affixed to cogwheel 18 positioned about the mold cavity so that turning the cogwheel in one direction causes the pins to be inserted into the mold cavity whereas rotating the cogwheel in the opposite direction causes the pins to retract from the mold cavity. Preferably, the attachment of sliding cams 20 to cogwheel 18 is such that sliding cams 20 may be easily removed for routine maintenance, inspection or replacement as they become worn or damaged. As shown in FIGS. 3 and 4, in a preferred embodiment the sliding cams are affixed to cogwheel 18 by fitting slidable cams through open slots in the cogwheel. One of ordinary skill in the art, however, would appreciate that alternative configurations may be used to affix slidable cams in proper position.

The number and position of sliding cams 20 correspond to the number and location of retractable pins 16 in the mold. The face of sliding cams 34 in contact with retractable pins 16 may be shaped to activate the retractable pins at a constant or variable rate. For example, the sliding cam surface in contact with the pins may be curved to vary the speed at which the pins move at different stages of activation. In a preferred embodiment, the sliding cams are wedge-shaped with a wedge angle θ of between about 5 degrees to about 30 degrees, more preferably having a wedge angle θ of between about 7 degrees to about 15 degrees. In yet another preferred embodiment, wedge angle θ is less than about 15 degrees, and more preferably less than 10 degrees. Thus, in a preferred embodiment sliding cams 20 engage and disengage retractable pins 16 at a relatively constant speed. The length l of cam insert 20 also affects the speed at which retractable pins 16 move in or out of the mold. Thus, for a given retractable pin travel distance and cogwheel rotational speed, a shorter sliding cam insert having a greater wedge angle θ will activate the retractable pins more quickly than a longer sliding cam having a smaller wedge angle θ.

Cogwheel 18 to which slidable cams 20 are affixed is preferably positioned so that its rotational movement is concentric with the mold cavity. More preferably, cogwheel 18 rotates about the pole to pole axis of the mold. In a preferred embodiment cogwheel 18 has gear teeth 36 along its outer circumference that mesh with a motor-driven rack 38. One skilled in the art would appreciate several configurations for turning cogwheel 18 to engage or disengage retractable pins 16 without departing from the present invention. For example, rack 38 may be driven by hydraulic or pneumatic action. As cogwheel 18 is turned, slidable cams 20 in contact with retractable pins 16 move the pins in or out of the mold.

When disengaged from the golf ball core, the retractable pins retract until the faces of the pins 24 are flush with the inside wall of the mold cavity. The faces of the retractable pins may be shaped to conform to the interior mold cavity. For instance, the pin faces may be shaped to form dimples on the golf ball cover, have a flat face or a simple radius cut to match the curvature of the mold cavity. Because retractable pins 16 operate approximately radially inward toward the ball center, i.e. in a direction approximately normal to the tangential plane of contact, the complexity and cost of shaping the inside end 24 of retractable pins 16 is significantly reduced. The number and arrangement of retractable pins 16 may vary according to dimple size and pattern. While the present invention permits retractable pins to be positioned nearly anywhere in the golf ball mold, it is preferred that the retractable pins contact the ball core surface at a point that is between about 10 degrees to about 80 degrees from the pole-to-pole axis of the golf ball mold, more preferably between about 30 degrees to about 60 degrees, and most preferably at about 45 degrees.

While the use of slidable cams 20 in the present invention is preferred, one of ordinary skill in the art would recognize alternative structures encompassed by the present invention suitable for carrying out the task of activating retractable pins 16. For instance, frictionless bearings may connect retractable pins 16 to cogwheel 18 so that rotation of the cogwheel activates the retractable pins. Moreover, outside end 26 of retractable pin 16 in contact with sliding cam face 34 may be shaped or modified to reduce frictional forces as the cogwheel is rotated and cam 20 slides across pins 16. As shown in FIG. 4, for example, the outside end 26 of retractable pins 16 may be enlarged and rounded. In addition, outside end 26 of retractable pin 16 may be fitted with a bearing so that the outside end 26 rolls across cam face 34 rather than frictionally sliding when cogwheel 18 turns.

Returning to FIG. 4, retractable pins 16 may be spring loaded to assist in retraction of the pins from the mold cavity. In one embodiment, spring 30 is positioned between mold plate 28 and outside end 26 of retractable pin 16. As illustrated in FIG. 4, a portion of mold plate 28 may be drilled or machined to receive spring 30. Likewise, the outside end 26 of retractable pins 16 may be shaped to hold springs 30 in place. Preferably, spring 30 is preloaded to apply sufficient force to cause retractable pin 16 to retract from the mold without overly exerting the outside end 26 of pin 16 against face 34 of slidable cam. 20. Insufficient loading of spring 30 may cause retractable pin 16 to not completely withdraw from the mold cavity, which may cause surface defects in the newly formed layer. Conversely, overloading of spring force may cause premature wear between retractable pin 16 and slidable cam 20. High wear-resistant materials also may be used to minimize wear between face 34 of sliding cam 20 and outside end 26 of retractable pin 16.

Preferably, a hot runner system 42 supplies continuously heated layer material into the mold cavity through the poles of the mold. In this embodiment, the injected material enters the mold cavity near the poles and travels toward the parting line of the golf ball mold. Once the mold cavity is filled, flow from the hot runner is restricted so that the layer material in the mold cavity may cool while the layer material in the primary runner remains in a molten state.

Thus, use of hot runner system 42 reduces the amount of scrap material and reduces cooling of the material as it travels from a reservoir of molten layer material to the mold. As would be appreciated by one of ordinary skill in the art, however, injection of layer material into the mold cavity need not be located at the poles of the mold. For instance, the present invention also may be used with conventional methods of injecting layer material into the mold cavity at or near the parting line of the mold cavity. For instance, a cold runner system may be used to inject material into the mold cavity. In this embodiment, layer material travels from a primary runner to a secondary runner near the mold cavity. The secondary runner is connected to the mold cavity by a plurality of gates. As the secondary runner fills with layer material, the pressure increases until layer material is forced through the plurality of gates into the mold cavity. Layer material in the primary runner, secondary runner and mold cavity is allowed to cool once the mold cavity is filled.

In use, a ball core 22 is placed inside the mold cavity and retractable pins 16 are engaged to securely hold the core in place. Layer material is injected into the mold cavity once ball core 22 is in proper position. In a preferred embodiment, retractable pins 16 are positioned such that there is sufficient space for injecting layer material into the mold cavity through gates at the poles rather than at the parting line of the mold. In this embodiment, the injected material enters the mold cavity from the poles and travels toward the parting line of the golf ball mold. Trapped air and other gasses escape the mold cavity through vents positioned at or near the parting line of the mold. Because the area surrounding the parting line is significantly larger than the area near the poles of the mold, trapped air and gasses can escape the mold cavity more quickly when vented at or near the parting line than can be achieved by venting at the poles. Moreover, positioning vents at or near the parting line also permits the opening for each vent to be sufficiently narrow to minimize, preferably to prevent completely, the forming of flash around the vents while still achieving improved venting. This embodiment also allows a user to easily and quickly remove unwanted debris from the vents anytime the mold is opened.

Retractable pins 16 may be disengaged from ball core 22 once the core is sufficiently covered by layer material to maintain its position within the mold. Preferably, retractable pins 16 are positioned so that they may be disengaged from the core before layer material contacts the retractable pins. Alternatively, the retractable pins may remain engaged until after the layer material has contacted, or even surrounded, the pins. When the retractable pins are disengaged under such conditions, any voids formed from retraction of the pins are filled by the injected material. Trapped air and other gasses in these voids may escape through a vent pin or through the space between the outer edges of retractable pins 16 and the pinholes in the mold cavity through which the pins operate.

Depending upon the number and position of retractable pins 16 in the mold, ejector pins 44 may be utilized to assist in removing the ball from the mold after completion of the molding process.

The present invention may be used both for injection molding processes and for injection/compression molding processes. In an injection molding process, mold plates 28 defining the mold cavity are joined in full registration and remain in position until the mold is opened to remove the ball from inside. In an injection/compression molding process, however, mold plates 28 may remain partially opened during part of the injection process. For instance, after ball core 22 is placed into a mold and secured in place by retractable pins 16, the mold plates may be positioned such that a gap remains that allows air and gasses to escape the mold during injection. As layer material fills the mold cavity, the plates are joined into full registration, thereby compressing the layer material in the mold cavity.

It will be understood that the above description and drawings are illustrative only, and that one of ordinary skill in the art can envision numerous variations and modifications in the disclosed retractable pin assembly without departing from the invention. It will be understood that the following claims are intended to cover all such variations and modifications that come within the spirit and scope of the present invention.

What is claimed is:

1. A retractable pin assembly for an injection mold comprising:
    (a) a retractable pin having one end inside a mold cavity and another end outside said mold cavity, said pin being oriented in a non-vertical plane;
    (b) a cam positioned against the outside end of said retractable pin, wherein said cam rotates to advance and retract the end inside the mold cavity.

2. The retractable pin assembly of claim 1, further comprising a ring gear onto which said cam is affixed.

3. The retractable pin assembly of claim 1 wherein said inside end of said retractable pin has a shape substantially similar to that of at least a golf ball dimple.

4. The retractable pin assembly of claim 1 wherein said inside end of said retractable pin has a shape substantially in conformance with the curvature of the inside wall of the mold.

5. The retractable pin assembly of claim 1 wherein the surface of said cam in contact with the outside end of said retractable pin is essentially planar.

6. The retractable pin assembly of claim 5 wherein the incline of said cam surface is inclined less than 30 degrees.

7. The retractable pin assembly of claim 6 wherein the incline of said cam surface is inclined less than 15 degrees.

8. The retractable pin assembly of claim 7 wherein the incline of said cam surface is inclined less than 10 degrees.

9. The retractable pin assembly of claim 1 further comprising a spring for retracting said pins from the mold.

10. A golf ball injection mold, comprising:
    (a) a first mold plate defining a first cavity having a substantially hemispherical inner surface terminating in a first parting line surface;
    (b) a second mold plate defining a second cavity having a substantially hemispherical inner surface terminating in a second parting line surface, wherein both said mold plates have mating surfaces for mating with each other along a predetermined plane, and together defining a substantially spherical mold cavity when said mating surfaces are joined;
    (c) a plurality of retractable pins that extend from the inner surface of the first and second mold cavities to the outer surface of a gold ball core to securely hold the core in position within the spherical mold cavity, wherein said retractable pins are oriented to operate in a direction essentially normal to the surface of the golf ball core; and (d) rotatably operated cams for engaging said plurality of retractable pins with a golf ball core.

11. The injection mold of claim 10 wherein the ends of said plurality of retractable pins within the spherical mold cavity are shaped substantially similar to that of a golf ball dimple.

12. The injection mold of claim 10 wherein the ends of said retractable pins within the spherical mold cavity are shaped substantially in conformance with the curvature of the inside wall of the mold.

13. The injection mold of claim 10 wherein said plurality of retractable pins are positioned to contact the ball core at an angle between about 10 degrees to about 80 degrees from the pole-to-pole axis of the golf ball mold.

14. The injection mold of claim 13 wherein said plurality of retractable pins are positioned to contact the ball core at an angle between about 30 degrees to about 60 degrees from the pole-to-pole axis of the golf ball mold.

15. The injection mold of claim 14 wherein said plurality of retractable pins are positioned to contact the ball core at an angle about 45 degrees from the pole-to-pole axis of the golf ball mold.

16. The injection mold of claim 10 further comprising injection gates positioned at the poles of each mold plate.

17. The injection mold of claim 16 wherein the injection gates are connected to a hot runner system.

18. The injection mold of claim 10 wherein said rotatably operated cams are affixed to at least one cogwheel positioned to rotate about an axis coincident with the pole-to-pole axis of the golf ball mold.

19. The injection mold of claim 18 wherein the incline of said rotatably operated cams is less than 30 degrees.

20. The injection mold of claim 19 wherein the incline of said rotatably operated cams is less than 15 degrees.

21. The injection mold of claim 10 further comprising at least one vent located near the parting line of the golf ball mold.

* * * * *